July 14, 1959
J. H. GUYTON
2,895,095
ELECTRONIC D.C. MOTOR
Filed Nov. 1, 1954
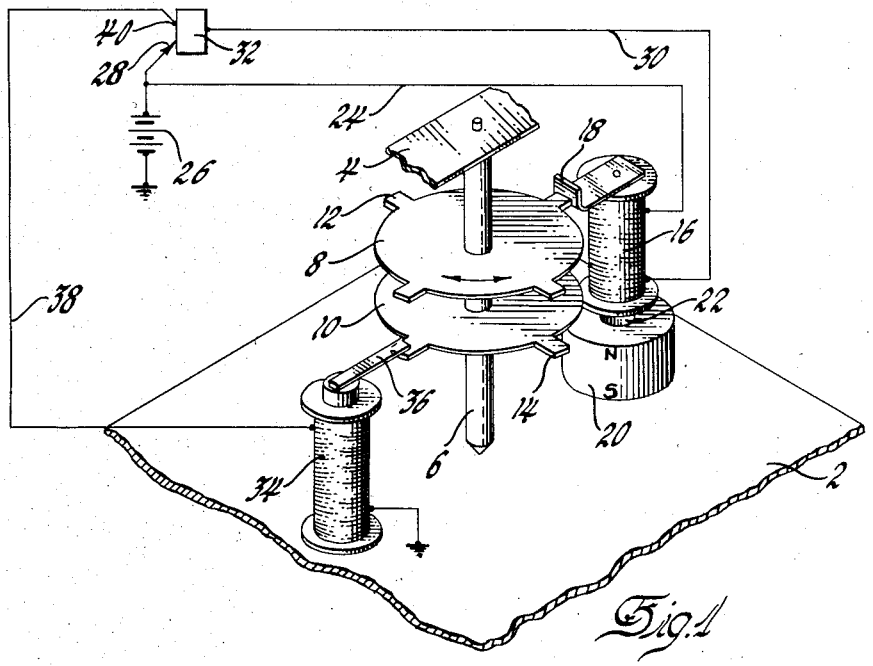
Fig.1
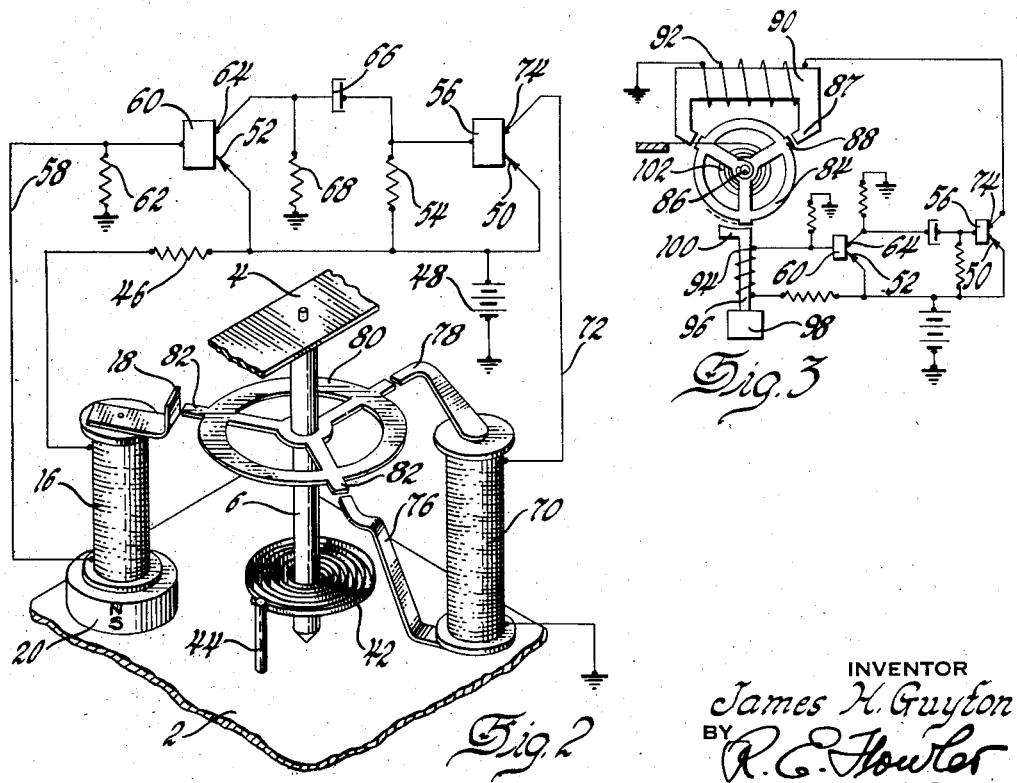
Fig.2
Fig.3
INVENTOR
James H. Guyton
BY
R. E. Fowler
ATTORNEY United States Patent Office 2,895,095
Patented July 14, 1959

2,895,095

ELECTRONIC D.C. MOTOR

James H. Guyton, Kokomo, Ind., assignor to General Motors Corporation, Detroit, Mich., a corporation of Delaware Application November 1, 1954, Serial No. 466,004

12 Claims. (Cl. 318—127)

This invention relates to D.C. motor design and, more particularly, to light load D.C. motor structure operating from low voltage direct current sources. In substantially all D.C. motor design some type of mechanical make and break contacts are provided somewhere in the circuit for its normal operation. Conventionally these may take the form of brush and commutator combinations, vibrator contacts, or solenoid contacts. Any of these contact arrangements, however, since they carry electric currents, are subjected to sparking and contact wear which are a potential source of eventual motor failure.

It is an object in making the present invention to provide a D.C. motor in which there are no electric contacts.

It is a still further object in making this invention to provide a contactless D.C. motor supplied by power of low voltage including some amplification means in the system.

It is a still further object in making this invention to provide a small D.C. contactless motor which can be used for electric clocks.

With the above and other objects in view, which will become apparent at this specification proceeds, my invention will be best understood by reference to the following specification and claims and the illustrations in the drawings, in which:

Figure 1 is a combined schematic and circuit diagram illustrating the basic principles of my contactless D.C. motor;

Figure 2 is a similar schematic and circuit diagram of a modified form of my invention showing its application to an electric clock mechanism; and Figure 3 is a circuit diagram showing a further modified form of drive through a D.C. motor.

Referring now more particularly to Figure 1, there is shown therein portions of a frame 2 and 4 which form a support for opposite ends of an armature shaft 6 which is freely rotatable as shown. Mounted on the shaft 6 are two spaced armature discs 8 and 10 of soft steel. Each of these armatures is provided on its periphery with a plurality of arcuately spaced extending tips 12 and 14. As shown in Figure 1, four of these tips are supplied on each disc spaced at approximately 90° but differing numbers may be provided, if desired. The function of the disc 8 is to provide a series of timed pulses which are generated by rotation of the shaft 6 and of disc 10 to apply the effect of these pulses to produce further rotary motion in timed relation to their generation. The upper disc 8 produces in a pickup 16 a current pulse when one of the tips 12 rotates past the end of an upturned core member 18. The pickup coil 16 is mounted on a permanent magnet 20 on the frame 2 and includes a central core 22, the upper end of which is secured to the pole member 18. A magnetic circuit is, therefore, created between the frame 2, permanent magnet 20, core 22, pole member 18, one of the tips 12, the disc 8, shaft 6, and back to the frame 2. Thus, when any one of the tips 12 rotates past the pole member 18, the magnetic circuit is varied and a pulse is generated in the pickup coil 16 surounding the core 22.

One terminal of the pickup coil 16 is connected through conductor 24 with one terminal of battery 26, the opposite side of which is grounded. It is also connected to the emitter electrode 28 of a transistor. The opposite terminal of the pickup coil 16 is connected through conductor 30 with the base 32 of the transistor. Thus, pulses are generated in the pickup coil 16 by the rotation of the shaft 6 and these pulses are amplified by the transistor. They are applied to a driving or motor coil 34, also mounted on the frame 2 and having an armature 36 which projects to a point adjacent the periphery of the driving disc 10. One terminal of the driving coil 34 is grounded and the other connected through conductor 38 to the collector electrode 40 of the transistor.

In the operation of the motor, which, incidentally, can run in either direction with equal ease, as one of the tips 12 approaches and comes into alignment with the pole 18, a pulse is generated in the pickup coil 16. This pulse is applied to the transistor where it varies the base current flow to in turn vary the emitter collector current to produce a similar amplified pulse which is applied to the driving coil 34. The position of the tips 14 with respect to the armature 36 is such that when this driving pulse is applied to the driving coil 34, the tip 14 is just approaching the armature 36 and thus this field tends to pull the disc 10 in the rotating direction to apply a driving pulse. In the construction shown there will be four driving pulses applied per revolution, the inertia of the member carrying it between pulses and it will continue to rotate in the direction in which it is started as long as power is applied to the circuit.

This construction obviously has a number of advantages. It eliminates any mechanical contactors which might burn or break and, therefore, be a source of failure. It consumes a very small amount of electric power, and, because of the transistor connections if the motor was stalled or stopped, would still only have a small current drain. Further, its mechanical construction is very simple. By using eight tips or projections on each disc, a larger number of driving pulses is obtained per revolution and less inertia carryover is needed.

It is, of course, possible to consolidate the two discs and to use one magnetic wheel or disc both for driving and pulse producing functions. Such a construction is shown in Figure 2 where the parts utilized appear to be more similar to clock units. As before, a suitable frame 2, 4 is provided in which a shaft 6 is rotatably mounted. A hair spring 42 has one end attached to the shaft near its lower extremity and the other end to an anchor pin 44 on the frame 2. The pickup coil in this instance is substantially the same as that shown in Figure 1, is carried by the frame 2, and consists of a permanent magnet 20, a pickup coil 16, and a flanged pole piece 18. One terminal of a pickup coil 16 is connected through a resistance 46 to one terminal of a source of D.C. voltage 48 which may be a conventional storage battery, the opposite terminal of which is grounded. The battery or source 48 is also connected to the emitter electrode 50 of a first transistor and the emitter electrode 52 of a second transistor. It is further connected through a resistor 54 to the base electrode 56 of the first transistor. The second terminal of the pickup coil 16 is connected directly by conductor 58 to the base 60 on the second transistor. A biasing resistor 62 is connected between conductor 58 and ground. The collector electrode 64 of the second transistor is connected through a condenser 66 to the base 56 of the first transistor. A biasing resistor 68 is connected between the collector electrode 64 and ground.

The driving or motor coil in this instance is shown at 70 and has one terminal grounded and the other connected through conductor 72 to the collector electrode 74 of the first transistor. The magnetic circuit of the driving coil 70 in this instance is completed by two angular arms 76 and 78, the first being clamped under the driving coil 70 and extending up and then parallel to the frame 2 terminating in a position adjacent the periphery of an armature disc 80 mounted on the shaft 6. A further angled arm 78 is supported on the top of the pickup coil, secured to the core thereof, and likewise extends to a spaced peripheral position to the disc or wheel 80. The wheel 80 is provided with a plurality of extending, arcuately spaced tips 82, there in this instance being three of these tips. As before, the tip which rotates in the vicinity of the pickup coil 16 results in the generation of a pulse therein which is amplified through an amplifying system including transistors and thence applied to the driving coil 70. The other two tips are so spaced that at that given instant they are both in the vicinity of the arms 76 and 78 so that rotative driving force is applied to the disc 80. Again, the shaft 6 may be driven in either direction, depending upon the desired design but, when the driving pulse is generated and applied to the coil 70, the tips 82 on the wheel 80 should be approaching the pole pieces 76 and 78 and the creation of the pulse should pull them into alignment and provide the driving energy necessary. With the hair spring connected to the shaft 6 in which resilient energy is stored by the rotation of the same shaft, oscillatory motion can be produced by said rotative pulse which loads the spring, which is then turned in the opposite direction by the energy stored in the spring. The transistors are connected in a two-stage amplifying circuit and provide the necessary amplification for the generated pulse to apply a satisfactory driving force to the coil 70 to maintain continued operation.

A similar system is shown in Figure 3, the difference being that in this latter system the generating pulse is different for one direction of operation than that in the opposite direction. The difference in the generated pulse which is utilized for driving purposes is provided by the shape of a pole piece adjacent the pickup coil. In Figure 3 the parts of the driving motor are shown diagrammatically and consist of the balance wheel 84 which is supported on a shaft 86 and has, as in Figure 2, a series of projecting tips 88. These oscillate in proximity to the spaced arms 87 of a magnetic core member 90 upon which is mounted a driving coil 92, one terminal of which is grounded. The pickup coil 94 is mounted around a magnetic core 96 associated with a permanent magnet 98 and has a shoe 100 which extends to a position adjacent the edge of the wheel 84. The shoe 100 extends in one circumferential direction for some little distance and the spacing between the forward edge of the shoe and the periphery of the wheel 84 gradually becomes less until the projection 88 on the balance wheel is in alignment with the core 96. Thus, the magnetic field changes gradually as the wheel 84 rotates in a counterclockwise direction but changes very rapidly when the wheel 84 rotates in a clockwise direction, thus providing a sharp pulse when rotating in that direction.

A hair spring 102 is connected to the wheel and to the framework to bias the balance wheel 84. The same connection for the transistor amplifier in two-stages is shown in Figure 3 as was used in Figure 2 and it consists of a first transistor consisting of a base 60, collector electrode 64, and emitter electrode 52, and a second transistor consisting of a base 56, emitter electrode 50 and collector electrode 74. The amplifying circuit is connected exactly the same as that shown in Figure 2. In this instance it is desired to produce a driving force in one direction only, causing the balance wheel to return through action of the hair spring. Thus, the pole piece 100 is so shaped as to cause a very slow change in the magnetic field and, therefore, a very small pulse when the balance wheel 84 rotates in a counterclockwise direction but to produce a very sharp change in the magnetic field and, therefore, a high amplitude pulse when the balance wheel 84 rotates in a clockwise direction. At that time the driving coil 92 supplies a driving force to the balance wheel to cause it to load the hair spring. The hair spring, of course, causes the return in the opposite direction and, therefore, the balance wheel 84 is provided with oscillatory movement which would be suitable for clock operation. All systems in Figures 1 to 3 inclusive are capable of operating on low voltage D.C. power such as that available from the storage battery in automotive vehicles.

I claim:

1. In electrical apparatus, a movably mounted irregularly shaped magnetizable part, a permanet magnet mounted adjacent said part and having a core extending to a point in proximity to the path of movement of the part, a coil mounted on said core in which current is generated by the irregular shape of the part as it moves with respect to said core, a driving coil located adjacent the part at a different location along its path of movement, a core for said driving coil extending in proximity to said part at a predetermined phased location, a source of controllable electrical power having an input and an output circuit and conductive means interconnecting said two coils and the input and output circuits of the source of power to apply a driving pulse to said driving coil when current is induced in the first-named coil by movement of the part.

2. In electrical apparatus, a rotatable magnetizable member having a plurality of spaced peripheral projections, a pickup coil mounted adjacent the periphery of the member in which pulses are generated by the passage of the projections, a source of controllable electrical power having input and output circuits, a driving coil electrically connected to the output circuit and the pickup coil connected to the input circuit of the source of power said driving coil being mounted adjacent the periphery of said member at a spaced point so located as to attract one of the projections on the member when a driving pulse is received from the pickup coil.

3. In an electrical motor, a rotor shaft, a magnetizable rotor mounted on said shaft and having a plurality of arcuately spaced projections, magnetic means mounted adjacent said rotor including a permanent magnet, core and pickup coil on said core, said core extending to a point adjacent the periphery of the rotor, so that as the rotor revolves a pulse will be generated in the pickup coil each time a projection on the rotor passes the core end, a driving coil, a core for said driving coil mounted to extend to a point adjacent the periphery of the rotor spaced from the first-named core and so located as to be slightly ahead of one of the projections on the rotor in its direction of rotation when a pulse is applied to the driving coil, a source of controllable electrical power having an input and an output circuit and electrically conductive means interconnecting the pickup coil and the input circuit of the source of power and the driving coil to the output circuit of the source of power to apply a pulse to the driving coil when a rotor projection passes the pickup coil core.

4. In an electrical motor, a rotor shaft, a magnetizable rotor mounted on said shaft and having a plurality of arcuately spaced projections, magnetic means mounted adjacent said rotor including a permanent magnet, core and pickup coil on said core, said core extending to a point adjacent the periphery of the rotor, so that as the rotor revolves a pulse will be generated in the pickup coil each time a projection on the rotor passes the core end, a driving coil, a core for said driving coil mounted to extend to a point adjacent the periphery of the rotor spaced from the first-named core and so located as to be slightly ahead of one of the projections on the rotor in its direction of rotation when a pulse is applied to the driving coil, a source of electrical power, amplifying means connected to the source of power and to the pickup coil to amplify the pulses generated in the pickup coil and means for connecting the amplifying means to the driving coil to apply the amplified pulse to said coil to drive said rotor.

5. In an electrical motor, a rotor shaft, a magnetizable rotor mounted on said shaft and having a plurality of arcuately spaced projections, magnetic means mounted adjacent said rotor including a permanent magnet, core and pickup coil on said core, said core extending to a point adjacent the periphery of the rotor, so that as the rotor revolves a pulse will be generated in the pickup coil each time a projection on the rotor passes the core end, a driving coil, a core for said driving coil mounted to extend to a point adjacent the periphery of the rotor spaced from the first-named core and so located as to be slightly ahead of one of the projections on the rotor in its direction of rotation when a pulse is applied to the driving coil, a source of electrical power, a transistor having a base, emitter and collector electrodes, said base and emitter being connected across the pickup coil and said collector and emitter being connected to the source of power and the driving coil to amplify the generated pulse for driving purposes.

6. In an electrical motor, a rotor shaft, a magnetizable rotor mounted on said shaft and having a plurality of arcuately spaced projections, magnetic means mounted adjacent said rotor including a permanent magnet, core and pickup coil on said core, said core extending to a point adjacent the periphery of the rotor, so that as the rotor revolves a pulse will be generated in the pickup coil each time a projection on the rotor passes the core end, a driving coil, a core for said driving coil mounted to extend to a point adjacent the periphery of the rotor spaced from the first-named core and so located as to be slightly ahead of one of the projections on the rotor in its direction of rotation when a pulse is applied to the driving coil, a source of electrical power and transistor amplifier means connected to the source of power, the pickup coil and the driving coil to apply an amplified signal to the driving coil.

7. In an electrical motor, a rotor shaft, a magnetizable rotor mounted on said shaft and having a plurality of arcuately spaced projections, magnetic means mounted adjacent said rotor including a permanent magnet, core and pickup coil on said core, said core extending to a point adjacent the periphery of the rotor, so that as the rotor revolves a pulse will be generated in the pickup coil each time a projection on the rotor passes the core end, a driving coil, a core for said driving coil mounted to extend to a point adjacent the periphery of the rotor spaced from the first-named core and so located as to be slightly ahead of one of the projections on the rotor in its direction of rotation when a pulse is applied to the driving coil, spring means connected to the rotor to bias the same and amplifying means interconnecting the two coils to apply a driving pulse to said driving coil when the rotor revolves.

8. In an electrical motor, a rotor shaft, a magnetizable rotor on said shaft having a plurality of peripherally spaced projections, a pickup coil mounted adjacent the rotor periphery in which pulses are induced when rotor projections move past, a driving coil mounted at a different phased peripheral location adjacent said rotor for applying a driving force to approaching projections, a source of low voltage direct current power and transistor amplifying means interconnecting the source of power and the pickup and driving coils to apply an amplified pulse to the driving coil when a pulse is generated in the pickup coil by the passage of one of the projections on the rotor.

9. In an electrical motor, a rotor shaft, a magnetizable rotor on said shaft having a plurality of peripherally spaced projections, a pickup coil mounted adjacent the rotor periphery in which pulses are induced when rotor projections move past, a driving coil mounted at a different phased peripheral location adjacent said rotor for applying a driving force to approaching projections, a source of low voltage direct current power, transistor amplifying means interconnecting the source of power and the pickup and driving coils to apply an amplified pulse to the driving coil when a pulse is generated in the pickup coil by the passage of one of the projections on the rotor, core means for each of said coils extending to points adjacent the periphery of the rotor, the core end for the driving coil being slightly ahead of a projection on the rotor when a pulse is generated in the pickup coil by passage of another projection.

10. In an electrical motor, a rotor shaft, a magnetizable rotor on said shaft having a plurality of peripherally spaced projections, a pickup coil mounted adjacent the rotor periphery in which pulses are induced when rotor projections move past, a driving coil mounted at a different phased peripheral location adjacent said rotor for applying a driving force to approaching projections, transistor amplifying means interconnecting the pickup and driving coils to apply an amplified pulse to the driving coil when a pulse is generated in the pickup coil by the passage of one of the projections on the rotor, core means for each of said coils extending to points adjacent the periphery of the rotor, the core means for the pickup coil providing a pole extending along the rotor path which varies in distance from the periphery of the rotor from one end to the other to provide a sharp pulse in one direction of rotation.

11. In an electrical motor, a rotor shaft, a magnetizable rotor on said shaft having a plurality of peripherally spaced projections, a pickup coil mounted adjacent the rotor, a driving coil mounted at a different location adjacent said rotor to apply a force to rotate the shaft in one direction, core means for each of said coils which extend to points adjacent the periphery of the rotor, spring means connected to the rotor to bias it for rotation in the opposite direction, the end of the core of the pickup coil providing a pole extending along the periphery of the rotor for some distance in a direction opposite to the direction of rotation caused by the spring bias and varying in distance from the periphery of the rotor from one end to the other to provide a sharp driving pulse in the direction of rotation to charge the spring and only a small pulse upon rotation in the opposite direction when driven by said spring.

12. In an electrical motor, a rotor shaft, a magneizable rotor on said shaft having a plurality of peripherally spaced projections, a pickup coil mounted adjacent the rotor, a driving coil mounted at a different location adjacent said rotor to apply a force to rotate the shaft in one direction, core means for each of said coils which extend to points adjacent the periphery of the rotor, spring means connected to the rotor to bias it for rotation in the opposite direction, the end of the core of the pickup coil providing a pole extending along the periphery of the rotor for some distance in the direction opposite to the spring bias and varying in distance from the periphery of the rotor from one end to the other to provide a sharp driving pulse in the direction of rotation to charge the spring and only a small pulse upon rotation in the opposite direction when driven by said spring, and transistor amplifying means connected between the pickup and driving coils to provide an amplified pulse to the driving coil.

References Cited in the file of this patent

UNITED STATES PATENTS

| 1,250,752 | Alexanderson | Dec. 18, 1917 |
| 2,297,084 | Swallow | Sept. 29, 1942 |
| 2,648,786 | Kritter | Aug. 11, 1953 |
| 2,685,026 | Cathcart | July 27, 1954 |
| 2,719,944 | Brailsford | Oct. 4, 1955 |

FOREIGN PATENTS

| 601,712 | Great Britain | May 11, 1948 |
| 1,090,564 | France | Oct. 20, 1954 |

Notice of Adverse Decision in Interference

In Interference No. 92,322 involving Patent No. 2,895,095, J. H. Guyton, Electronic D.C. motor, final judgment adverse to the patentee was rendered June 25, 1964, as to claims 1, 2, 3, 4, 5, 6, 7, 8, 9, 10, 11 and 12.

[*Official Gazette August 25, 1964.*]

Notice

Strike out "In interference No. 92,322 involving Patent No. 2,895,095, J. H. Guyton, Electronic D.C. motor, final judgment adverse to the patentee was rendered June 25, 1964, as to claims 1, 2, 3, 4, 5, 6, 7, 8, 9, 10, 11 and 12."

This notice supersedes the one previously issued in the Official Gazette of Aug. 25, 1964, p. 838.

[*Official Gazette October 27, 1964.*]